No. 842,652. PATENTED JAN. 29, 1907.
E. HAMILTON.
BOTTLE.
APPLICATION FILED NOV. 8, 1905.
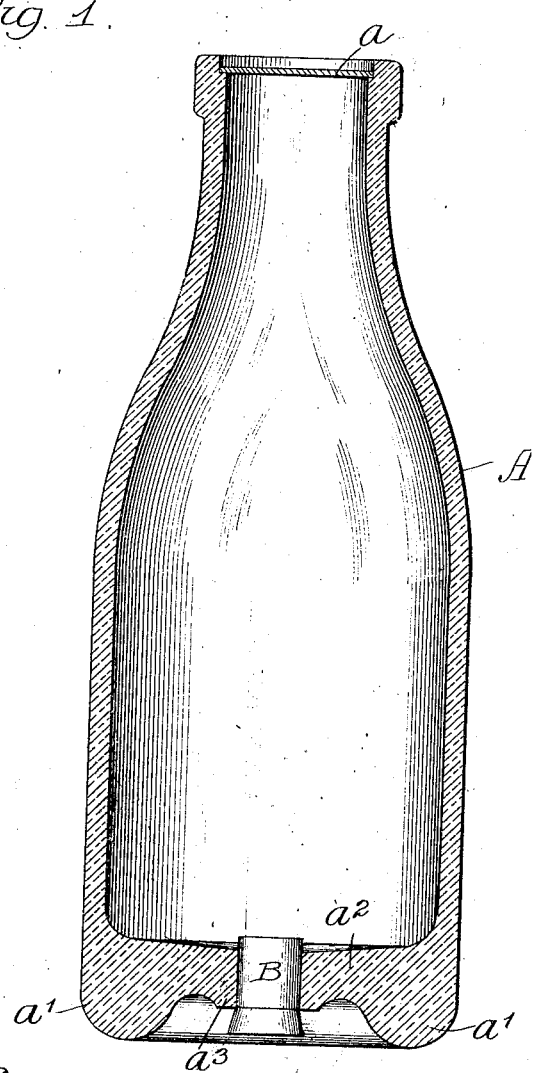
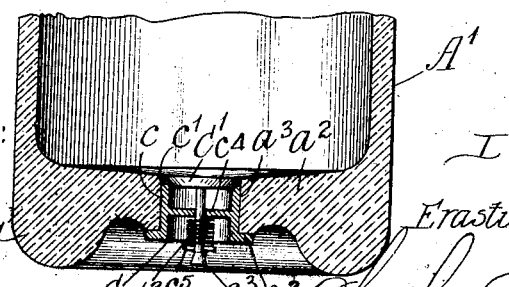
Witnesses:
Harry R. L. White
Ray White
Inventor:
Erastus Hamilton
By Charles W. Pillsbury, Atty.

UNITED STATES PATENT OFFICE.

ERASTUS HAMILTON, OF CHICAGO, ILLINOIS.

BOTTLE.

No. 842,652.　　　Specification of Letters Patent.　　Patented Jan. 29, 1907.

Application filed November 8, 1905. Serial No. 286,321.

*To all whom it may concern:*

Be it known that I, ERASTUS HAMILTON, a citizen of the United States, and a resident of the city of Chicago, in the county of Cook and State of Illinois, have invented certain new and useful Improvements in Bottles; and I do hereby declare that the following is a full, clear, and exact description of the same, reference being had to the accompanying drawings, and to the letters of reference marked thereon, which form a part of this specification.

This invention relates to improvements in bottles, and more particularly to a bottle of that class used in supplying or delivering milk to the trade. Heretofore in bottles of this class it has only been possible to empty or remove the milk from the aperture through the neck or the top of the bottle, and consequently it has been impossible to separate the cream from the milk, as is often desired. Furthermore, in milk-bottles as usually constructed the bottom is higher at its center than adjacent the sides of the bottle, thereby forming a depression, in which the remaining milk or impurities after the bottle has been emptied settle and adhere, making perfect cleansing difficult and causing the bottles to soon become unsanitary.

The object of this invention is to provide a sanitary bottle or receptacle for milk or the like and in which the milk may be quickly and readily drawn from the separated cream, leaving the latter in the bottle or receptacle. It is a further object of the invention to provide a milk bottle or receptacle capable of being much more readily and easily cleaned than similar devices as heretofore constructed.

The invention consists in the matters hereinafter described, and more fully pointed out and defined in the appended claims.

In the drawings, Figure 1 is a vertical central section of a bottle embodying my invention, showing parts in elevation. Fig. 2 is a fragmentary central section showing a slight modification.

As shown in said drawings, A represents a bottle of the usual or any preferred form and provided at its top with the ordinary closure $a$, of paper-board or any desired material. The lower end of said bottle is provided with a downwardly-directed peripheral flange $a'$, which extends below the bottom $a^2$ sufficiently to form considerable space below the same. Said bottom $a^2$, as shown, is concave on its upper surface, thereby providing a gradual slope from the side walls to the center, which is the lowest portion of the bottle toward which all the drain is directed. The bottom $a^2$ is also provided with a central axial aperture $a^3$, in which any preferred form of closure may be rigidly but removably engaged; but, as shown in Fig. 1, a closure B, of cork, rubber, or other desired material, is employed and which is inserted from without the bottle.

If preferred, the closure for the aperture $a^3$ may be provided with a valve, as shown in Fig. 2, in which the bottle A' is provided with a bottom $a^2$, as before described, and rigidly engaged in the central aperture $a^3$ thereof is the closure (indicated as a whole by C) and comprising, as shown, a shell or sleeve $c$, of indurated rubber, metal, or any preferred material, adapted to fit closely within said aperture $a^3$, and the upper end of which is flush with the upper surface of said bottom and tapered or beveled inwardly, forming a valve-seat $c'$. The lower end of said sleeve $c$ is provided with an outwardly-directed peripheral flange $c^2$, adapted to engage the under surface of said bottom and limit the upward movement of said closure therein. Formed complementally with and adapted to engage on said valve-seat $c^3$ is the valve C', provided with a downwardly-extending stem $c^3$, which passes through a guide or spider $c^4$ integral with said seat and is provided on the lower end thereof with a spring $C^2$, the upper end of which engages against said spider $c^4$ and the lower end thereof against a pin or other desired means $c^5$ in said stem and normally acts to hold said valve rigidly upon its seat, thereby completely closing the bottom aperture.

The operation is as follows: Inasmuch as the bottom of the bottle or receptacle is concave on its upper surface, the lowest point of the bottom is at its center, toward which the contents of the bottle tend to drain and to pass out of the central aperture $a^3$, thereby leaving no depression or corner in the bottle adjacent the walls to collect coagulated milk or other impurities and making it possible to thoroughly cleanse the same. Inasmuch as the closure fits tightly within said central aperture, it is evident that no leakage can pass the same, and when it is desired to remove the milk from the bottle in case the closure B is used it is only necessary to remove or partly remove the closure, when the milk may be drawn off, leaving the cream in the bottle, which may afterward be drawn off or emptied, if preferred, thereby thoroughly separating the one from the other. If it is desired to use a valved closure, such as shown in Fig. 2, the milk may be removed from the bottle by opening the valve C' inwardly by means of the stem $c^3$, thereby opening the bottom of the bottle and permitting the milk to escape, and when the pressure on said stem is released the valve will again close. When, however, it is desired to clean the bottle, the entire closure may be removed, as before described, permitting the contents of the bottle to be thoroughly drained therefrom.

Owing to the concave shape of the bottom all parts of the same may be readily reached in washing the bottle, thereby making it impossible for impurities to remain, and obviously any preferred form of closure for the bottom aperture may be employed without departing from the principles of my invention.

I claim as my invention—

1. A device of the class described comprising a bottle having a concave inner bottom surface and an outer bottom surface hollowed to form a thickened supporting-flange and having a central aperture therethrough, a sleeve rigidly engaged in said aperture having a concave upper end flush with the top of said aperture and affording a valve-seat, a peripheral flange on the bottom of said sleeve engaging the bottom of the bottle and limiting the upward movement of the sleeve, a centrally-apertured guideway in said sleeve, a stem engaging in said guideway, a beveled valve on the upper end thereof affording a valve-closure, a spring engaging the under side of said guideway and normally holding the valve seated.

2. A device of the class described comprising a bottle having an inner bottom surface rounded at the edge and gradually tapering to the center, a hollow outer bottom surface having a centrally-thickened bearing-face provided with a central aperture therethrough, a sleeve engaged in said aperture having a flanged lower end adapted to seat against said bearing-face and a beveled upper end, an integral guideway in said sleeve, a stem engaged in said guideway having its lower end enlarged, a pin projecting from each side of said stem, a rearwardly-beveled valve adapted to seat on said beveled sleeve and a spring engaged between said guide and pin adapted to normally hold the valve seated.

3. A device of the class described comprising a bottle having a concave bottom therein provided with a central aperture opening therethrough, a removable sleeve adapted to fit tightly in said aperture and provided with an inwardly-beveled upper end, a peripheral flange on the bottom of said sleeve adapted to engage the bottom of the bottle and limit the inward movement of said sleeve, a central guide in said sleeve, a valve-stem movably engaged therein, a closure on the inner end of said stem adapted to seat on the beveled end of said sleeve, a transverse pin in the outer end of said stem and a spring engaged between said pin and said guide and acting normally to hold the closure seated.

In testimony whereof I have hereunto subscribed my name in the presence of two subscribing witnesses.

ERASTUS HAMILTON.

Witnesses:
WM. C. SMITH,
W. W. WITHENBURY.